Figure 1:
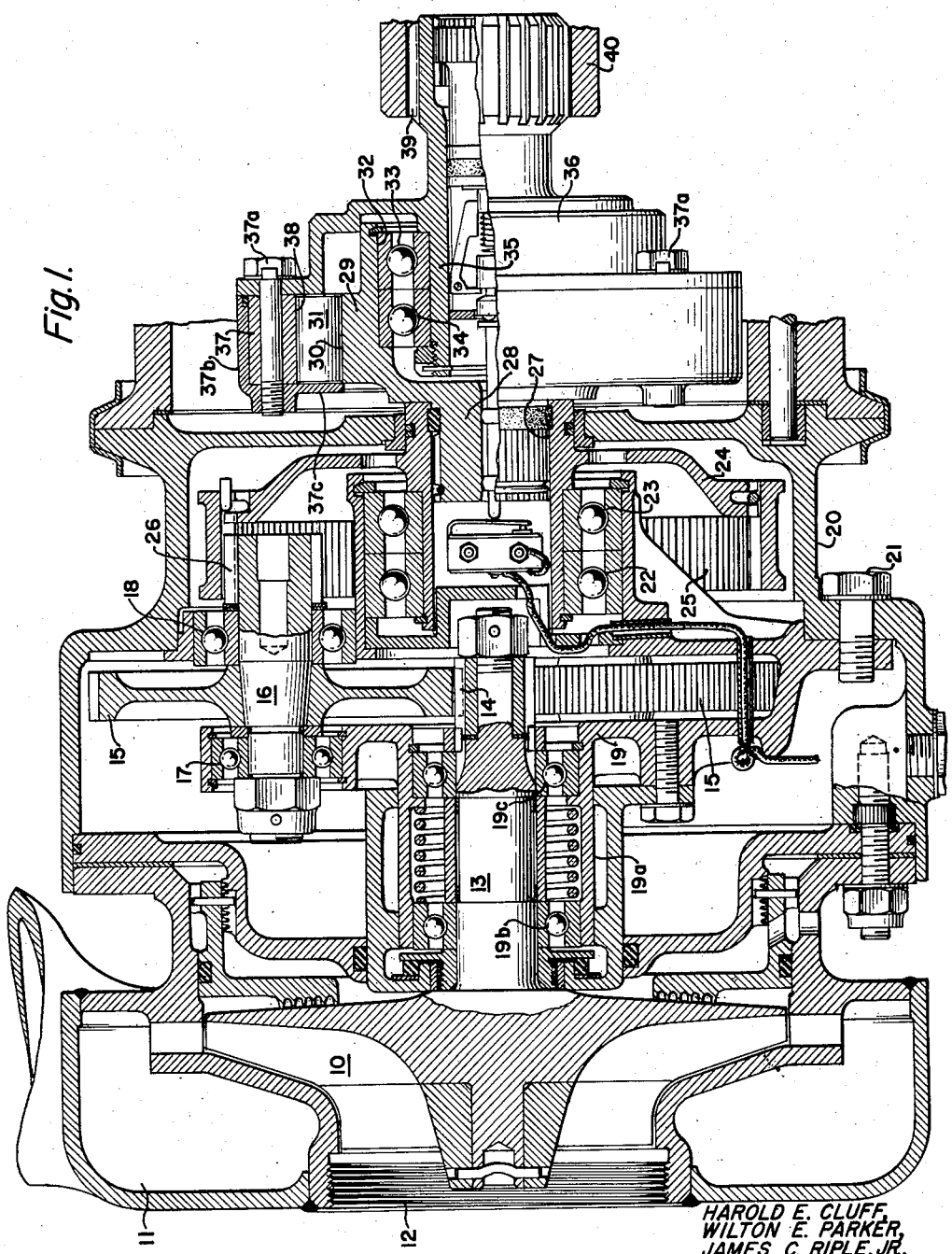

HAROLD E. CLUFF,
WILTON E. PARKER,
JAMES C. RIPLE, JR.,
INVENTORS.

BY John H.G. Wallace

Oct. 20, 1959  H. E. CLUFF ET AL  2,909,166
AIR TURBINE STARTER
Filed Oct. 19, 1955  2 Sheets-Sheet 2

HAROLD E. CLUFF,
WILTON E. PARKER,
JAMES C. RIPLE, JR.,
INVENTORS.

BY John H.G. Wallace

United States Patent Office 2,909,166
Patented Oct. 20, 1959

2,909,166

AIR TURBINE STARTER

Harold E. Cluff, Phoenix, Ariz., and Wilton E. Parker, Encino, and James C. Riple, Jr., Redondo Beach, Calif., assignors to The Garrett Corporation, Los Angeles, Calif., a corporation of California Application October 19, 1955, Serial No. 541,396

3 Claims. (Cl. 123—179)

This invention relates to an engine starter and more particularly to a starter for engines such as aircraft engines or the like.

Heretofore, various types of engine starters have been installed in a fixed relation to the axes of shafts or other rotating elements of engines requiring power starters. Some of these starters are provided with drive or output shafts which are connected or engaged in axial alignment with shafts of the engines to be cranked and started. In such installations the starter housing is usually bolted or clamped to structure on the engine whereby some eccentricity of the starter, relative thereto, may occur. This causes slight misalignment of the starter and engine shaft axes and results in undue stresses being exerted on shaft bearings and other parts in the starter. Additionally, such misalignment causes undesirable vibration to occur during high speed operation of reduction gears, bearings and other mechanisms of the starter.

The gear trains of previous starters have had a tendency to vibrate, or respond to induced vibration, due to the lack of precise unitary support for the bearings and other rotating elements thereof.

According to the present invention, an engine starter is arranged to be fixed on an engine to be cranked, and is provided with a drive shaft which remains engaged with rotating structure of the engine. The starter is provided with a gear train which drives an overrunning clutch through a loosely fitted spline mechanism, which acts as a universal joint, while the overrunning clutch is provided with part of a second loosely fitted spline mechanism which also acts as a universal joint and serves to transmit motion from the overrunning clutch to the engine. The overrunning clutch, having such joints on its opposite ends operates smoothly intermediate the starter gear train and the rotating structure of the engine, even though they may be slightly misaligned due to inaccurate mounting of the starter on the engine. When the starter is misaligned relative to the engine, the present invention prevents undue loading of the starter bearings, overrunning cluch and gear train and also prevents excessive vibration thereof. In addition to the foregoing features, the present invention embodies improvements in starter gear trains. These gear train improvements cooperate with the overrunning clutch and universal joints, whereby vibration and wear in the driving elements of the starter are minimized. The entire reduction gear mechanism and turbine of the starter are supported in a unitary, rigid casting which provides for precise assembly of the motor and reduction gear elements. Such an arrangement also greatly reduces production and maintenance costs.

It is an object of the present invention to provide a simple driving connection for a power starter and engine, which will operate smoothly and reliably even though a slight misalignment of the starter, relative to the engine, may exist.

Another object of the invention is to provide an engine starter having a novel unitary structure for rigidly supporting bearings of the motor shaft and connected gear train elements, whereby vibration and wear of the starter mechanism are minimized.

Another object of the invention is to provide an engine starter having a novel cooperative structural arrangement including a motor shaft, a gear train and an overrunning clutch, whereby improved mechanical alignment of all such power transmitting mechanism minimizes vibration thereof.

Another object of the invention is to provide an overrunning clutch having a novel misalignment compensation, preventing undue stresses and wear in the overrunning clutch when it interconnects misaligned rotating mechanisms.

Another object is to provide a very compact and light weight starter, particularly adapted for installation on aircraft engines.

A further object of the invention is to provide an engine starter having a very durable overrunning clutch mechanism which may remain connected to a rotating element of an engine during continuous operation thereof.

Figures 2, 3:
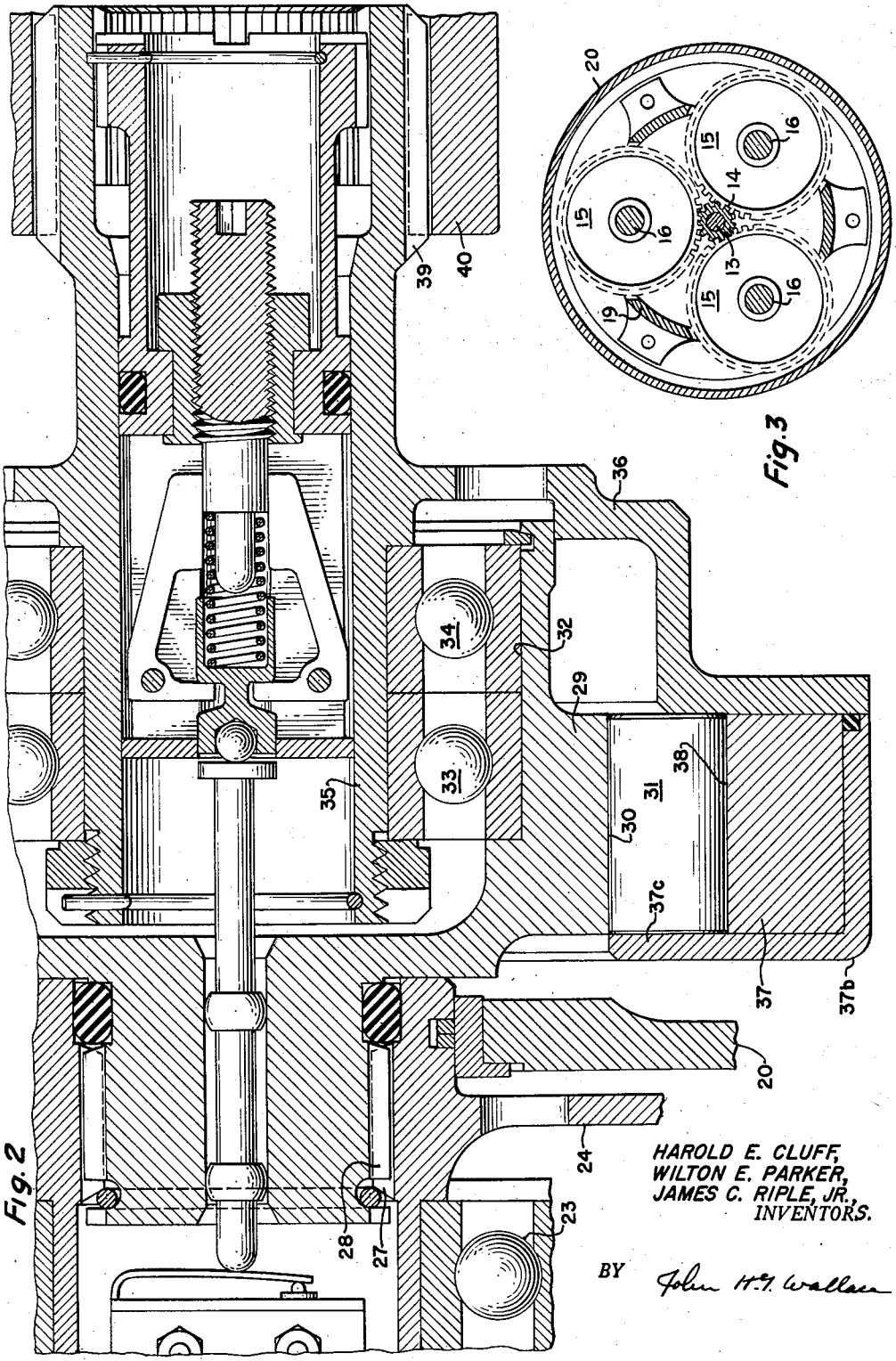

These and other objects of the invention will be apparent from the following specification, appended claims and accompanying drawings in which:

Fig. 1 of the drawings is a longitudinal sectional view of an engine starter, according to the present invention, showing portions in elevation to facilitate the illustration;

Fig. 2 is an enlarged fragmentary sectional view taken on substantially the same plane as Fig. 1 and showing details of the clutch and spline arrangement; and Fig. 3 is a vertical transverse sectional view taken through the engine starter shown in Fig. 1 and illustrates parts of a gear train employed therein.

As shown in Fig. 1 of the drawings, the starter according to the present invention is provided with a turbine wheel 10 having a surrounding inlet plenum 11 arranged to conduct compressed air or gas into the wheel 10 for supplying motive power thereto. The wheel 10 is provided with a central outlet 12 arranged to conduct expanded air or gas therefrom. The turbine wheel 10 is the motor element of the starter which embodies the present invention; however, motor elements of other types for example, electric, may be used in such a starter. The turbine 10 is provided with a shaft 13 having a pinion gear 14 fixed thereon. The pinion gear 14 meshes with reduction gears 15 carried on stub shafts 16 supported in bearings 17 and 18.

The bearings 17 and 18 are mounted in the bearing frame 19 fixed to an outer casing 20 of the starter by means of bolts 21. The bearing frame 19 is provided with a cylindrical bearing retaining boss 19a which supports bearings 19b and 19c in which the shaft 13 is journalled. The frame 19 also supports bearings 22 and 23 which carry the hub of a disk-shaped member 24 to the periphery of which is connected an internal ring gear 25. This ring gear 25 meshes with spur gears 26 on the stub shafts 16. It will be noted that the bearing frame 19 is a rigid unitary casting which supports all the rotating motor and reduction gear train elements of the starter.

The unitary mounting of all such rotating elements greatly contributes to precise assembly of gears, and rigid support for the bearings which carry the gears. This is extremely important to the successful operation of high speed air turbine starter gear trains when interposed between a turbine wheel and a clutch mechanism which is arranged to drive an engine to be cranked. The precise assembly of individual gear train elements afforded by the unitary frame member 19, at the outset alleviates inaccuracies which might cause vibrational tendencies, while rigidity of the gear train frame resists tendencies of the elements carried thereby to respond to induced vibration. Also, the gear train, thus precisely and rigidly supported, does not respond to vibration which might be introduced through the driving connection with an engine being cranked.

The disk-shaped member 24 which forms a part of the gear train is provided with an internal spline structure 27 which engages external splines of a stub 28 which is integral with an inner clutch member 29. The inner clutch member is provided with an external surface 30 engageable by overrunning rollers 31. The inner clutch member 29 is also provided with an internal bore 32 in which bearings 33 and 34 are mounted. These bearings 33 and 34 support an inwardly extending shaft portion 35 of an outer clutch member 36 which carries a clutch ring 37 having a cam surface 38 engageable with the overrunning rollers 31. Extending through the outer clutch member 36 and clutch ring 37 are bolts 37a which are screw threaded into a casing member 37b. This casing member is provided with a wall 37c arranged to retain the ends of the rollers 31 thus locating the opposite ends thereof adjacent the outer clutch member 36 and in proper position relative to the outer surface 30 of the inner clutch member 29. The bearings 33 and 34 maintain the clutch members 29 and 36 in concentric relationship with each other in order to provide a uniform operating relationship and loading of the overrunning rollers 31 relative to the surface 30 and the cam surface 38. Fixed to the clutch member 36, in axial alignment with the shaft portion 35, is a spline stub 39 ararnged to engage internal splines of a shaft 40. The shaft 40 may be any rotating element of an engine or other mechanism to be cranked or rotated.

It will be noted that the spline stubs 28 and 39, best seen in Fig. 2, are provided with slight clearance in their engagement relationship with internal spline structures 27 and 40, respectively. Thus, the spline mechanisms on each end of the overrunning clutch are loosely engaged permitting any slight offset or misalignment which there might be of the axes of the spline structures 27 and 40. In effect, the spline stubs 28 and 39, in cooperation with the spline structures 27 and 40, respectively, operate as angularly limited universal joints. Accumulated tolerances allowed in the structures for mounting starters on engines may account for a slightly offset relationship of the axes of the spline structures 27 and 40. The spline structures acting as universal joints at opposite ends of the overrunning clutch members 29 and 36 permit the clutch to be interposed between the starter gear train and a misaligned engine shaft without creating undue or non-uniform loading of the overrunning rollers 31, bearings 33 and 34 or undue stresses in any of the structures cooperating with the disk member 24.

We claim:

1. In a starter for an engine of the type having a movable element: a one piece frame having spaced connected sections with tubular portions projecting in opposite directions; bearing means supported by said tubular portions; a starting motor shaft journalled for rotary movement in the bearing means in one of said tubular portions; a hollow member journalled for rotation in the bearing means in the other tubular portion; an internal ring gear carried by said hollow member and projecting back over said other tubular portion; registering sets of bearing means disposed in said spaced sections in eccentric relation to said starting motor shaft; stub shaft means journalled in said sets of bearing means; intermeshing gears on said starting motor shaft and stub shaft means in the space between said sections; additional gear means on said stub shaft means in meshing engagement with said internal ring gear; an overruning clutch mechanism having inner and outer members connected for relative rotary movement in one direction and rotation in unison in the opposite direction; and spline means projecting from opposite ends of said overrunning clutch mechanism for limited universal driving connection with said hollow member and the movable element of the engine to form the sole support of said overrunning clutch mechanism.

2. In a starter for an engine of the type having a movable element: a casing disposed for substantially rigid connection to the engine; a one piece frame member rigidly secured to said casing; a starting motor shaft journalled for rotation in said frame member; an output shaft journalled for rotation in said frame member, said output shaft being aligned with and axially spaced from said starting motor shaft; a plurality of spaced stub shafts journalled in said frame member, said stub shafts being radially spaced equidistantly from said starting motor shaft; intermeshing gear means carried by said starting motor shaft and said stub shafts; an internal ring gear carried by said output shaft; additional gear means carried by said stub shafts and meshing with said internal ring gear; an overrunning clutch mechanism; and motion transmitting means with limited universal movement connecting and supporting said clutch mechanism at one end by said output shaft and by the movable element of said engine at the other end.

3. In a starter for an engine of the type having a movable element: a casing with an end wall, said casing providing a chamber; a frame member secured to said casing within said chamber; a starting motor shaft journalled for rotation in said frame member; an output shaft journalled in said frame member substantially in alignment with said starting motor shaft, said output shaft extending a limited distance through said casing end wall; a gear train carried by said frame and transmitting motion from said starting motor shaft to said output shaft; an overrunning clutch mechanism at the opposite side of said end wall from said chamber; and motion transmitting means with limited universal movement for connecting said clutch mechanism with said output shaft and the movable element of the engine, said clutch mechanism being supported solely by said motion transmitting means.

References Cited in the file of this patent

UNITED STATES PATENTS

| | | |
|---|---|---|
| 2,076,015 | Broome | Apr. 6, 1937 |
| 2,221,315 | O'Kun | Nov. 12, 1940 |
| 2,322,608 | Webster | June 22, 1943 |
| 2,625,047 | Wood | Jan. 13, 1953 |
| 2,721,482 | Shank et al. | Oct. 25, 1955 |